(12) United States Patent
Headland

(10) Patent No.: US 9,617,920 B2
(45) Date of Patent: Apr. 11, 2017

(54) SEALING ARRANGEMENT FOR A NOZZLE GUIDE VANE AND GAS TURBINE

(71) Applicant: Siemens Aktiengesellschaft, Munich (DE)

(72) Inventor: Paul Headland, Lincoln (GB)

(73) Assignee: Siemens Aktiengesellschaft, Munich (DE)

( * ) Notice: Subject to any disclaimer, the term of this patent is extended or adjusted under 35 U.S.C. 154(b) by 309 days.

(21) Appl. No.: 14/395,192

(22) PCT Filed: Apr. 16, 2013

(86) PCT No.: PCT/EP2013/057864
§ 371 (c)(1),
(2) Date: Oct. 17, 2014

(87) PCT Pub. No.: WO2013/164184
PCT Pub. Date: Nov. 7, 2013

(65) Prior Publication Data
US 2015/0071761 A1    Mar. 12, 2015

(30) Foreign Application Priority Data

May 3, 2012    (EP) ..................................... 12166642

(51) Int. Cl.
*F01D 9/06* (2006.01)
*F02C 7/28* (2006.01)
*F01D 9/04* (2006.01)

(52) U.S. Cl.
CPC ................ *F02C 7/28* (2013.01); *F01D 9/041* (2013.01); *F05D 2240/81* (2013.01); *F05D 2260/202* (2013.01)

(58) Field of Classification Search
CPC ........... F02C 7/28; F01D 9/041; F01D 25/246
See application file for complete search history.

(56) References Cited

U.S. PATENT DOCUMENTS 4,384,822 A * 5/1983 Schweikl ................ F01D 9/042
                                              415/115
5,129,738 A    7/1992 Nakagawa
(Continued)

FOREIGN PATENT DOCUMENTS

| CN | 101037947 A | 9/2007 |
|----|-------------|--------|
| EP | 1795703 A2  | 6/2007 |
| EP | 2180143 A1  | 4/2010 |

*Primary Examiner* — Richard Edgar
(74) *Attorney, Agent, or Firm* — Beusse Wolter Sanks & Maire

(57) ABSTRACT

A nozzle guide vane support arrangement including a platform portion of a nozzle guide vane at a trailing edge is provided, the platform portion having a platform wall including a first platform wall portion and a second platform wall portion. A working fluid interaction surface and a cooling surface at least partly limit an inner cavity of the platform portion in which a cooling fluid is leadable. The second platform wall is connected to the first platform wall at an axial downsealing arrangement and gas turbinesealing arrangement for a nozzle guide vane and gas turbinestream end of the platform portion. A first surface of the second platform wall limits the inner cavity, and a support structure including a seal arranged in a recess between the support structure and a second surface of the second wall to reduce cooling liquid leakage from the inner cavity to a space downstream.

23 Claims, 2 Drawing Sheets

(56) References Cited

U.S. PATENT DOCUMENTS

| | | |
|---|---|---|
| 5,129,783 A | 7/1992 | Hayton |
| 6,572,331 B1 | 6/2003 | Mohammed-Fakir et al. |
| 6,939,106 B2 | 9/2005 | Burdgick |
| 7,322,797 B2 | 1/2008 | Lee |
| 2002/0127097 A1 | 9/2002 | Darolia |
| 2006/0038358 A1 | 2/2006 | James |

\* cited by examiner

SEALING ARRANGEMENT FOR A NOZZLE GUIDE VANE AND GAS TURBINE

CROSS REFERENCE TO RELATED APPLICATIONS

This application is the US National Stage of International Application No. PCT/EP2013/057864 filed Apr. 16, 2013, and claims the benefit thereof. The International Application claims the benefit of European Application No. EP12166642 filed May 3, 2012. All of the applications are incorporated by reference herein in their entirety.

FIELD OF INVENTION

The present invention relates to a nozzle guide vane sealing arrangement, to a nozzle guide vane arrangement and to a gas turbine comprising the nozzle guide vane arrangement.

ART BACKGROUND

A gas turbine may comprise one or more combustors in which fuel and compressed air delivered from a compressor stage of the gas turbine is burned. The burned mixture of fuel and compressed air is expelled from the combustor and introduced into a turbine stage of the gas turbine. The turbine stage may comprise one or more stages of nozzle guide vanes which alternate with one or more stages of turbine blades, which are driven by the burned mixture of fuel and compressed air, which may be also referred to as working fluid, in particular working gas.

The nozzle guide vanes may be arranged around the rotation axis around which a rotor shaft rotates, wherein at the rotor the turbine blades are connected. The nozzle guide vane stage or the nozzle guide vane stages may be assembled from a plurality of circumferential segments each segment comprising one, two or even more nozzle guide vanes. Each segment of the nozzle guide vanes may be a cast metal piece or may also be made of ceramics. The first stage of the nozzle guide vanes represents the first structure to redirect the working fluid or working gas, after having been exhausted from the combustor, towards the first stage of the turbine blades, wherein this first stage of the turbine blades is located downstream (in the direction of the working fluid streaming out of the combustor) of the first stage of the nozzle guide vanes.

U.S. Pat. No. 5,129,783 discloses a gas turbine engine having a ceramic nozzle guide vane and a metal engine casing, wherein a nozzle guide vane mounting comprises on the radially outermost end of the vane a circumferential flange extending at right angle to the long axis of the vane, a first spring means for applying a radially inward force to the radially outer surface of the flange, wherein the spring means may be a C-ring seals made of a resilient material.

US 2002/0127097 A1 discloses a turbine vane assembly, wherein an airfoil shaped vane is releasably carried in a turbine vane assembly including inner and outer vane supports by at least one high temperature resistant compliant seal.

U.S. Pat. No. 6,939,106 B2 discloses a steam turbine including a stator supporting a plurality of turbine nozzles, wherein the stator has shaped grooves for receiving a complementary-shaped nozzle hook formed on an end of each of the turbine nozzles and a rope seal is disposed in each interface between the nozzle hooks and the shaped grooves, respectively, wherein the rope seal serves to seal a leakage path that may exist over the nozzle hooks between the nozzles and respective stator grooves.

US 2006/0038358 A1 discloses a sealing arrangement in a gas turbine engine comprising a rope seal held against a sealing surface by resilient seal carrier in which the rope seal lies.

There may be a need for a nozzle guide vane support arrangement, for a nozzle guide vane arrangement and for a gas turbine, wherein cooling of the turbine nozzle is improved and wherein in particular an amount of cooling air consumed by the turbine nozzle is reduced.

SUMMARY OF THE INVENTION

This need may be met by the subject matter of the independent claim. The dependent claims specify particular embodiments of the present invention.

According to an embodiment of the present invention it is provided a nozzle guide vane sealing arrangement (in particular also having support function), comprising: a (in particular radially inner) platform portion of a nozzle guide vane at a trailing edge of the nozzle guide vane, the (in particular inner) platform portion having a platform wall, the platform wall having a first platform wall portion and a second platform wall portion, the first platform wall portion comprising a working fluid interaction surface on a (in particular radially outer) first side thereof and a cooling surface on a (in particular radially inner) second side thereof, the cooling surface at least partly limiting an inner cavity of the platform portion in which inner cavity a cooling fluid is leadable; the second platform wall portion being connected to the first platform wall portion at an axial downstream end of the platform portion, a (in particular radially outer) first surface of the second platform wall portion at least partly limiting the inner cavity (in particular radially inwards); a support structure for supporting the platform portion, the support structure having a recess; a seal (also referred to downstream seal), in particular rope seal, arranged in the recess between the support structure and a (in particular radially inner) second surface of the second wall portion, wherein the seal is adapted to reduce cooling liquid leakage from the inner cavity to a space downstream the nozzle guide vane arrangement.

The nozzle guide vane support arrangement may in particular comprise sections and elements for supporting a nozzle guide airfoil. Thereby, the platform portion (in particular an inner platform portion) of the nozzle guide vane may be a section or portion of the nozzle guide vane which may be integrally formed together with an airfoil of the nozzle guide vane. The nozzle guide vane support arrangement and its elements may be adapted to be used in a gas turbine, in particular for supporting or partly forming a first stage of nozzle guide vanes.

The nozzle guide vane support arrangement may comprise the platform portion separated from the support structure and separated from the seal. In particular, the platform portion, the support structure and the seal may be individual, physically distinct elements.

Additionally to the platform portion (either the radially inner platform portion or the radially outer platform portion) the nozzle guide vane may comprise an aerofoil between the radially inner platform portion and the radially outer platform portion for directing the working fluid, in particular working gas, towards subsequent rotor blades arranged downstream of the nozzle guide vane in a streaming direction of the working fluid.

The aerofoil of the nozzle guide vane may comprise a leading edge at which the working fluid first impinges and the nozzle guide vane aerofoil may further a trailing edge at which the working fluid leaves the nozzle guide vane aerofoil. In particular, a region of the platform portion around or close to the trailing edge of the nozzle guide vane (in particular the radially inner platform portion) may be subjected to or exposed with hot working fluid being expelled from the one or more combustors in a particular severe manner.

Thereby, in particular this radially inner platform portion of the nozzle guide vane may require particular cooling during operation. In particular, the working fluid interaction surface of the first platform wall portion may be subjected to the hot working fluid and may thus heat-up during operation.

For cooling the (in particular radially inner) platform portion the inner cavity of the platform portion may be filled with or may be flown through by a cooling fluid which may then be in thermal contact with the cooling surface of the first platform wall portion in order to absorb heat, which has been absorbed at the working fluid interaction surface and which has been conducted through the first platform wall portion towards the cooling surface at least partially limiting the inner cavity of the platform portion.

The first platform wall portion and the second platform wall portion may be integrally formed and may represent a single physical part, which may in particular be manufactured by casting metal.

The first platform wall portion or at least the working fluid interaction surface may primarily extend in the axial direction, wherein the axial direction is parallel to a rotation axis of the rotor at which the rotor blades are connected. In particular, in cross-section, the working fluid interaction surface may be at least approximately parallel to the rotation axis, thus may extend substantially in the axial direction.

The cooling surface may in particular comprise one or more turbulators for introducing turbulence into the flow of the cooling fluid in order to improve heat transfer from the cooling surface to the cooling fluid.

The nozzle guide vane support arrangement may be described referring to directions, like the axial direction, the radial direction or the circumferential direction, which refer to the respective directions when the nozzle guide vane support arrangement is assembled into a turbine, in particular a gas turbine. Thereby, in particular the axial direction corresponds or is at least parallel to the rotation axis of the rotor at which the rotor blades are connected. The radial direction is perpendicular to the axial direction directing away from the rotation axis. The circumferential direction is a direction tangentially to a circumference of a circle having at its center the rotation axis.

In particular, the nozzle guide vane support arrangement may represent a circumferential segment, wherein from a plurality of such circumferential segment an annular circumferentially completed arrangement may be assembled.

At the downstream end of the platform portion the platform portion may comprise a bent portion where the first platform wall portion and the second platform wall portion join each other. In particular, the cooling surface of the first platform wall portion and the first surface of the second plat-form wall portion may at least partially enclose or limit the inner cavity for containing cooling fluid therein.

The support structure may represent a so-called carrier ring and may be physically distinct from the platform portion. The support structure may be made of a metal. In particular, the support structure may be arranged radially inwards from the platform portion when assembled in a gas turbine. The support structure may comprise one or more elements such as a hook, as a connection element for connecting the platform portion to the support structure.

The nozzle guide vane support arrangement may be adapted to resiliently fix or mount the platform portion (and in particular the whole nozzle guide vane including the platform portion) to the support structure, in order to allow different thermal expansion of the platform portion and the support structure. In particular, during operation the platform portion may primarily expand in the axial direction, whereas the support structure may primarily expand in the radial direction. By resiliently contacting the platform portion and the support structure via the seal a relative movement or relative sliding of the platform portion (or at least a section thereof) and the support structure is enabled, thereby avoiding or reducing strain.

The rope seal may comprise plural wires which are arranged close to each other and which may in particular be braided. In particular, the seal may be a braided wire rope seal, in particular with a ceramic inner core.

When cooling fluid, in particular cooling air, is contained within the inner cavity the cooling fluid is, due to the seal, prevented from leaving the inner cavity or at least the flow rate of the cooling fluid leaving the inner cavity via a path along or through the seal is reduced. In particular, the flow rate of the cooling liquid flowing from the inner cavity towards a disk cavity may be reduced. Thereby, less cooling air is required to be supplied to the inner cavity since the cooling air is not wasted into the space, in particular into the disk cavity downstream of the support structure. Thereby, the cooling function of the cooling fluid introduced into the inner cavity may be improved.

The inner cavity may also be referred to as plenum chamber.

In a cross-section the seal may have an oval shape or a circular shape or a rectangular shape when no pressure is exerted onto the seal. In operation the seal may deform, thus may alter its (cross-sectional) shape such as to conform to the shape (at least partially) of the second surface of the second wall portion and the structure or shape of the recess in the support structure. In particular, the second surface of the second wall portion may comprise a substantially flat portion with which the second surface contacts the seal.

Thereby, the second platform wall portion may via the second surface slide along the seal, when the platform portion expands due to thermal induced expansion. Thereby, a reliable operation of a gas turbine may be ensured during several operation states, such as during start-up or during changing the operation conditions from low load to high load or from high load to low load which changes involve changing component temperatures.

According to an embodiment of the present invention the second surface of the second platform wall portion extends inclined relative to the first platform wall portion at an acute angle. In particular, the second surface of the second platform wall portion extends (in particular in a cross-sectional view) inclined relative to the working fluid inter-action surface of the first platform wall portion.

Thereby, a sealing function of the seal may also be ensured when the platform portion expands due to an increasing temperature. In this case the platform portion may primarily expand in the axial direction thus introducing or causing a movement (relative to the support structure) also of the second surface of the second wall portion which is enabled (or admitted or allowed) by sliding along or across the seal with a in particular plane surface portion of the second surface of the second wall portion.

The acute angle may be between 20° and 45°, in particular may be between 20° and 35°.

According to an embodiment of the present invention an extent of the first wall portion in the axial direction is larger than an extent in the radial direction, wherein the extent of the first wall portion in the axial direction is in particular between 5 times and 30 times of the extent in the radial direction.

When the first wall portion has a larger extent in the axial direction than in the radial direction the amount of expansion upon heating the first platform wall portion may be larger in the axial direction than in the radial direction. In spite of this thermal expansion primarily in the axial direction the sealing function may be maintained due to the geometry of the first platform wall portion and the second plat-form wall portion, in particular due to the slanted second surface of the second platform wall portion and the configuration of the seal received partly within the recess.

According to an embodiment of the present invention the second wall portion and/or the first surface of the second platform wall portion and/or the second surface of the second platform wall portion is inclined relative to the axial direction by an angle between 25° and 45°.

Thereby, sliding of the second surface of the second wall portion along the seal during thermal expansion of the platform portion is enabled while maintaining the sealing function.

According to an embodiment of the present invention the platform wall, in particular the first platform wall portion, comprises at least one (or a plurality thereof) opening or a hole or a cooling fluid duct (towards a working fluid passage along which the working fluid flows towards the downstream rotor blades) to provide cooling liquid communication between the inner cavity and a working fluid passage for providing in particular film cooling.

In particular, the at least one opening may be arranged at a location close to or downstream of the trailing edge of the aerofoil of the nozzle guide vane, which is subjected to excessive heating during operation. Thereby, cooling of nozzle guide vane portions or components may be improved.

According to an embodiment of the present invention the platform portion is a radially inner platform portion. This may in particular be the case when the one or more combustors are arranged to primarily expel or exhaust the burned mixture of gas and compressed air with a working fluid direction which has a component directing radially inwards and having another component directing axially downstream. Thereby, in particular the inner platform portion may be subjected to especially high temperatures or wear or stress. Thus, in particular this platform portion may require advanced or improved cooling.

According to an embodiment of the present invention the first side of the first platform wall portion is a radially outer side of the first platform wall portion. This radially outer side of the first platform wall portion may be in contact with the working fluid during operation.

According to an embodiment of the present invention the second side of the first platform wall portion is a radially inner side of the first platform wall portion. Thus, the second side of the first platform wall portion may be in contact with the cooling fluid contained within the inner cavity.

According to an embodiment of the present invention the arrangement comprises an plate structure, in particular impingement plate or (metal) band, for separating a cooling fluid supply chamber (located radially inwards from the inner cavity) from the inner cavity, wherein the plate structure in particular comprises at least one hole for allowing cooling fluid passage (directing primarily radially inwards) from the cooling fluid supply chamber into the inner chamber.

The impingement plate may contain multiple holes, in particular multiple rows of multiple holes or conduits, in particular having a diameter between 0.8 mm and 1.5 mm, for allowing cooling fluid to pass from the cooling fluid supply chamber to the inner cavity.

The impingement plate may be a bent or press formed metal piece (such as made of a high temperature resistant Ni-alloy) having a thickness of e.g. between 0.5 and 0.8 mm. The impingement plate may be clipped or flipped into corresponding grooves or notches of the support structure. Thereby the engagement elements or portions may be radially inwards with respect to a portion comprising the at least one hole. The portion (hole portion) of the impingement plate comprising the at least one hole (in particular rows of many holes) may extend in the axial direction.

When fully assembled the impingement plate (and/or the cooling fluid supply chamber and/or the inner cavity) may be annular.

The radial extent of the inner cavity may be between 3 mm and 10 mm.

Cooling fluid may be supplied to the cooling fluid supply chamber at an axial position corresponding to the trailing edge of the nozzle guide vane. From the inner cavity cooling liquid may be lead through conduits into an interior of the nozzle guide vane. The interior of the nozzle guide vane may comprise cooling channels running traverse or perpendicular to main surfaces of the nozzle. The channels may be grouped and separated by pedestals. The channels may comprise dimples for increasing a surface area for improved cooling. The nozzle guide vane may comprise exit holes for allowing the cooling fluid to exit the interior of the nozzle guide vane, in particular at the training edge.

A nozzle mounting hook may be located upstream of the further seal or axially at a same position.

The support structure, in particular a portion of the inner cavity may comprise reinforcing walls or pedestals, in particular downstream of the downstream edge of the nozzle guide vane.

According to an embodiment of the present invention the arrangement further comprises a further seal (also referred to as upstream seal), in particular rope seal, which is arranged between the support structure and the platform portion at an axial position upstream from the seal, to seal the inner cavity.

The impingement plate may be located axially between the seal and the further seal.

A cross-sectional size/shape of the seal and the further seal may be the same or different. The cross-sectional shape may be circular in a relaxed condition. The cross-sectional size may be e.g. between 3 mm and 5 mm in diameter or even larger when applied to a large gas turbine.

For supporting and/or holding the further seal the support structure may comprise a further recess or groove. The recess and the further recess may represent integrally formed/cast parts of the support structure. In contrast the impingement plate may be a part separate from the support structure and may not be integrally formed with other parts of the support structure. The further seal may protrude from the further recess axially upstream. The further seal may contact the further recess axially downstream, radially inwards, radially outwards, but not axially upstream. The seal may contact the recess axially downstream and radially inwards, but not radially outwards, and not axially upstream.

Discharge of cooling fluid may be sealed at the upstream side by the further seal and at the downstream side by the seal, to hold the cooling fluid within the inner chamber from where it may be lead partly into the interior of the nozzle and partly through film cooling holes into a working fluid passage close to the trailing edged of the nozzle.

Fully assembled the seal and the further seal may be annular.

According to an embodiment of the present invention the first surface of the second platform wall portion is a radially outer surface of the second platform wall portion and at least partially limits the inner cavity radially inwards.

According to an embodiment of the present invention the support structure comprises a retaining wall extending radially, in particular outwards, and being arranged downstream of the recess, for preventing the seal to move axially downstream when a radially directed, in particular inward, force is exerted by the second surface of the second wall portion onto the seal.

The retaining wall may be integrally formed with other elements of the support structure. The force exerted to the platform portion may be caused by the flowing working fluid partially impinging onto the working fluid interaction surface of the first platform wall portion. Thereby, the force may comprise a component which is directed radially inwards such that the second surface of the second platform wall portion pushes onto the seal in the radially inward direction in order to deform the seal. Thereby, a sealing function may be maintained, since the seal is resilient and may provide its sealing function for different magnitudes of forces applied thereon.

The retaining wall may be immediately adjacent to the recess and may contact the seal with an upstream surface of the retaining wall. The retaining wall may provide at its upstream section a surface area which contacts the seal, wherein this surface section may primarily extend in the radial direction when viewed in cross-section. Thereby, the arrangement may be utilized for different operational stages of a gas turbine involving different magnitudes of forces applied to the seal.

According to an embodiment of the present invention the retaining wall extends radially outwards farther than the seal. Thereby, the seal may be effectively prevented from slipping out or moving axially downstream, thus properly retaining the seal within the recess of the support structure. Further, a compression limiting function may be provided by the retaining wall in order to avoid compressing or deforming the seal in an excessive manner.

According to an embodiment of the present invention a most radially protruding portion of the retaining wall contacts (in a particular operational state) the second surface of the second platform wall portion to provide a limit of a movement of the second surface of the second platform wall portion in the radial direction and/or to provide a seal compression limiting function, in particular if the force in the radial direction is larger than a threshold.

The most radially (in particular outwardly) protruding portion of the retaining wall may contact the second surface of the second platform wall portion in a situation when a especially high radially inward force is applied by the working fluid onto the platform portion and thus onto the seal via the second surface of the second platform wall portion. When this contact is established the sealing function is still maintained.

According to an embodiment of the present invention the arrangement further comprises a mounting hook (or plural mounting hooks) to mount the platform portion at the support structure axially upstream of the seal and upstream of the retaining wall. Thus, at one or more positions the platform portion may be connected to the support structure not via a resilient element. Thereby, the stability may be improved. At the same time disassembling the platform portion and also the whole nozzle guide vane including the platform portion from the support structure may be enabled or possible, for example for exchanging a worn out nozzle guide vane arrangement.

According to an embodiment of the present invention it is provided a nozzle guide vane arrangement comprising a nozzle guide vane support arrangement according to one of the embodiments as described above and a nozzle guide vane aerofoil supported by the nozzle guide vane support arrangement.

The nozzle guide vane may comprise the nozzle guide vane inner platform portion, the nozzle guide vane outer platform portion and the nozzle guide vane aerofoil arranged between the nozzle guide vane outer platform and the nozzle guide vane inner platform portion.

According to an embodiment it is provided a gas turbine, comprising at least one combustor, at least one nozzle guide vane arrangement according to the embodiment as described above, wherein the nozzle guide vane is in particular the first nozzle guide vane at which working fluid expelled from the combustor impinges.

A complete ring of nozzle guide vanes may be assembled from plural nozzle guide vane arrangements which may circumferentially arranged and connected to each other. Further, the gas turbine may comprise one or more stages of rotor blades which are connected to a rotation shaft rotating around the axial direction.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
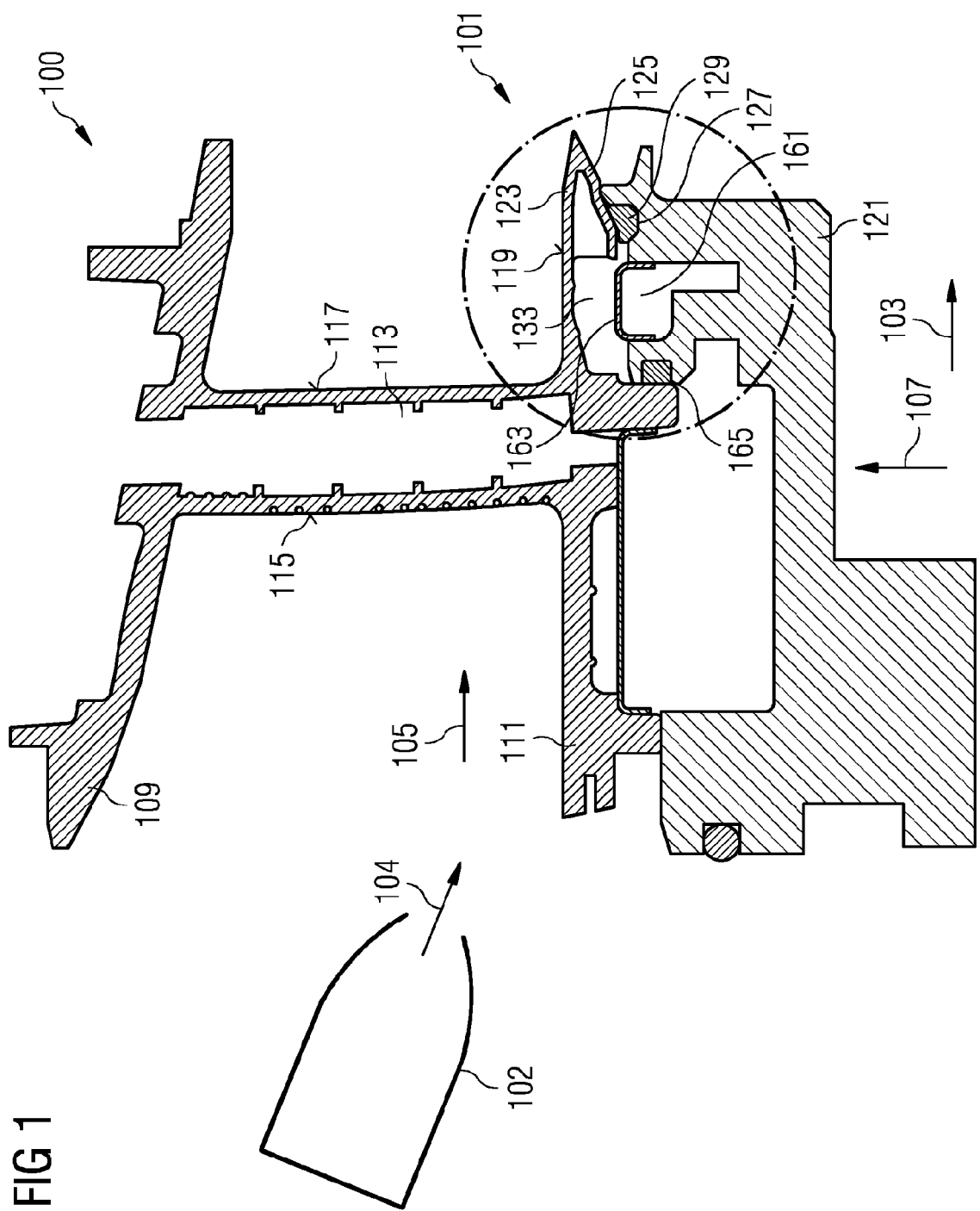
FIG. 1 schematically illustrates a cross-sectional view of a portion of a gas turbine including a nozzle guide vane arrangement according to an embodiment of the present invention.

FIG. 1 schematically illustrates a nozzle guide vane arrangement 100 for a gas turbine according to an embodiment of the present invention. The nozzle guide vane arrangement 100 comprises a nozzle guide vane support arrangement 101 according to an embodiment of the present invention, which is described in detail with reference to FIG. 2 below.

The nozzle guide vane arrangement 100 is to be used in a gas turbine comprising a rotation shaft rotating around an axis in an axial direction 103. A combustor 102 is schematically illustrated in FIG. 1, which exhausts working fluid 104 flowing along a working fluid direction 105, thereby allowing to specify relative positions of elements using the specifications "upstream" and "downstream", respectively, relative to the working fluid direction 105.

A radial direction is indicated by reference sign 107, wherein the radial direction 107 is directed away from the rotation axis 103. A circumferential direction is perpendicular to the drawing plane of FIGS. 1 and 2.

The nozzle guide vane arrangement 100 comprises a radially outer platform 109, a radially inner platform 111 and an aerofoil 113 arranged between the radially outer platform portion 109 and the radially inner platform portion 111. The elements 109, 111, 113 are integrally formed by casting. The radially outer platform portion 109, the radially inner platform portion 111 and the aerofoil 113 represent stator portions of the gas turbine, which do not move during operation of the gas turbine. The aerofoil 113 has an upstream edge 115 and a downstream edge 117. In particular, during operation of the gas turbine a downstream region 119 of the radially inner platform portion 111 is subjected to especially wear due to the impinging high temperature working fluid 104. Thus, this portion 119 may require particular cooling.

The radially inner platform portion 111 is mounted at a support structure 121 by not illustrated hooks, for example a hook at a position upstream of the aerofoil 113. The radially inner platform portion 111 comprises a first platform wall portion 123 and a second platform wall portion 125. In a recess 127 a seal 129, in particular a braided wire rope seal 129, is arranged, wherein the support structure 121 is shaped in order to provide the recess 127 into which the seal 129 fits.

The arrangement further comprises a further seal 165, in particular rope seal, which is arranged between the support structure 121 and the platform portion 111 at an axial position upstream from the seal 129, to seal the inner cavity 133. Thereby, the cooling fluid introduced to the inner cavity 133 via the impingement plate 163 is contained with the inner cavity 133 for cooling purpose.

Figure 2:
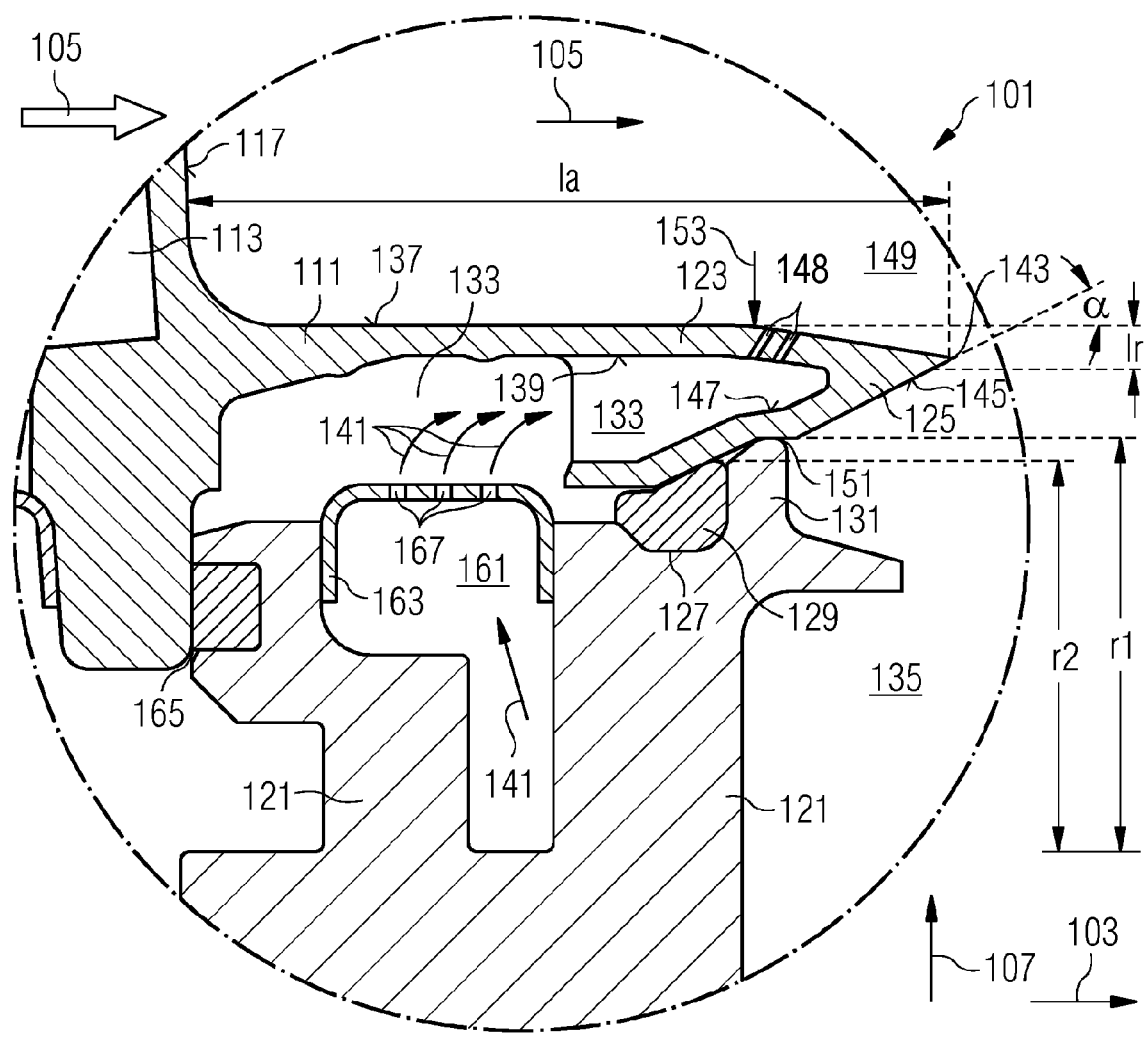
FIG. 2 schematically shows a detailed view of FIG. 1 illustrating a nozzle guide vane support arrangement according to an embodiment of the present invention.

FIG. 2 schematically shows a detailed view of the nozzle guide vane support arrangement 101 of FIG. 1 according to an embodiment of the present invention. The support structure 121 extends in the radial direction 107 and comprises the recess 127, in particular forming a shape of a depression in the radial direction 107 for receiving a round, oval or circular seal 129.

At a downstream portion of the support structure 121 a retaining wall 131 is provided, which extends radially up to an amount r1 which is larger than a radial extent r2 of the seal 129. Thus, the retaining wall 131 protrudes in the radial direction 107 the seal 129, in particular in a relaxed state in which no force is exerted on the seal.

The support structure 121 comprises an impingement band 163 (in particular not integrally formed but representing a separate structure fixed to the support structure) for separating a cooling fluid supply chamber 161 (into which cooling air is fed) from the inner cavity 133, wherein the impingement band/plate 163 comprises at least one hole 167 for allowing cooling fluid passage from the cooling fluid supply chamber 161 into the inner chamber 133.

The further seal 165, in particular rope seal, which is arranged between the support structure 121 and the platform portion 111 at an axial position upstream from the seal 129, seals the inner cavity 133 prohibiting outflow of cooling fluid from the inner cavity 133.

The cooling fluid 141 is leadable in the inner cavity 133. In other words, the cooling fluid 141 is guidable in the inner cavity 133.

The seal 129 and the further seal 165 reduce leakage of cooling liquid 141 contained in an inner cavity 133 towards a disc cavity 135 downstream of the support structure 121 and thus also downstream of the seal 129. The platform portion 111, i.e. the radially inner platform portion 111, comprises a first platform wall portion 123 comprising a working fluid interaction surface 137 and a cooling surface 139 opposite to the working fluid interaction surface 137. The cooling surface 139 partly limits the inner cavity 133, in which the cooling fluid 141, in particular compressed air, is contained or is flowing. Further, the cooling surface 139 is in thermal contact with the cooling liquid 141 supplied to the inner cavity 133.

The radially inner platform 111 further comprises a second platform wall portion 125, which is connected to the first platform wall portion 123 forming a bent portion 143 at a downstream end of the radially inner platform portion 111. In particular, the angle a is formed between the working fluid interaction surface 137 and the second surface 145 of the second platform wall portion 125. In particular, (at the bent portion 143) the working fluid interaction surface 137 of the first platform wall portion 123 and a second surface 145 of the second platform wall portion 125 include an acute angle a which may range between 20° and 35°.

A first surface 147 of the second platform wall portion 125 also partly limits the inner cavity 133, in which the cooling liquid 141 is contained or flowing.

An extent la of the first platform wall portion 123 in the axial direction 103 is much larger than an extent lr in the radial direction 107. Also the extent of the entire platform portion 111 downstream of the aerofoil 113 in the axial direction 103 is much larger, such as between three times and ten times, than the extent of the platform portion downstream the aerofoil 113 in the radial direction 107.

Further, the first platform wall portion 123, in particular a downstream portion thereof, comprises openings or ducts 148 to provide a cooling liquid communication between the inner cavity 133 and a working fluid passage 149 arranged radially outwards of the radially inner platform portion 111. In the working fluid passage 149 the working fluid 104 may propagate along the working fluid direction 105. Through the openings 148 cooling fluid contained within the inner cavity 133 flows out into working fluid passage 149, in particular to provide film cooling of the platform portion 111 at a downstream section thereof.

The retaining wall 131 prevents by its radially most outward portion (radial position r1) that the cooling liquid 141 flows through the gap or contact point 151 between the retaining wall 131 and the second surface 145 of the second wall portion to reach the disk cavity 135. The radially extreme outward portion, in particular the contact point 151, of the support structure 121 or the retaining wall 131 pro-vide a limiting function to limit the radial inward movement of the second platform wall portion 125 when a high (pressure) force 153 is applied onto the platform portion 111 via the working fluid interaction surface 137 and thus onto the second surface 145 of the second platform wall portion 125 and thereby to the seal 129.

The platform portion 111, due to its large extent in the axial direction 103, primarily expands in the axial direction 103 but to a smaller degree in the radial direction 107. In contrast, due to the relatively large extent in the radial direction 107 of the support structure 121 being larger than the extent in the axial direction 103, the support structure 121 primarily expands in the radial direction 107.

In order to allow operation of the gas turbine at varying temperature the platform portion 111 needs to be allowed to move relative to the support structure 121 taking into account their thermal expansion into different directions.

Thus, a slanted or ramped surface 145 (including the angle a with the axial direction 103 or with the direction of the working fluid interaction surface 137 of the first platform wall portion 123) ensures that through all or at least most of the gas turbine operational states a positive mechanical pressure 153 is maintained on the rope seal 129. For example, during start-up the nozzle, in particular the platform portion 111, may heat-up faster than the support structure 121 (also referred to as the carrier) and during this time the platform portion 111 may expand in the axial direction and may slide relative to the support structure. The gas pressure may push the platform portion 111 towards the seal 129.

The retaining wall 131 may ensure that the seal 129 cannot be pushed into the disc cavity 135 and also provides the seal compression limiting feature so that the seal 129 cannot be excessively compressed during transient gas turbine conditions.

The recess 127, also referred to as seal rebate, may function in a two-fold manner. First, the recess 127 is designed to hold the seal 129 in place during cold build and to allow for a larger diameter seal than could otherwise be accommodated with a flat face on the carrier or support structure 121.

The protrusion, the radial protrusion of the retaining wall 131, i.e. the contact point 151, provides a compression limiting feature. In particular, during operation of the gas turbine the nozzle training edge 117 may not deform uniformly due to the thermal loading of this portion. The ends of the segment may dip down and the center may raise up. The compression limiting feature limits the movement of the corners of the nozzle.

Thereby, the embodiments of the present invention may increase component life time and improve cooling air efficiency.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A nozzle guide vane sealing arrangement, comprising:
a platform portion of a nozzle guide vane, the platform portion having a platform wall,
the platform wall having a first platform wall portion and a second platform wall portion,
the first platform wall portion comprising a working fluid interaction surface on a first side thereof and a cooling surface on a second side thereof, the cooling surface at least partly limiting an inner cavity of the platform portion in which inner cavity a cooling fluid is leadable;
the second platform wall portion being connected to the first platform wall portion at a downstream end of the platform portion, a first surface of the second platform wall portion at least partly limiting the inner cavity;
a support structure for supporting the platform portion, the support structure having a recess;
a seal arranged in the recess between the support structure and a second surface of the second platform wall portion,
wherein the seal is adapted to reduce cooling liquid leakage from the inner cavity to a space downstream the support structure.

2. The arrangement according to claim 1,
wherein the second surface of the second platform wall portion extends inclined relative to the first platform wall portion at an acute angle (a).

3. The arrangement according to claim 1,
wherein an extent (la) of the first platform wall portion in the axial direction is larger than an extent (lr) in the radial direction.

4. The arrangement according to claim 1,
wherein the second platform wall portion and/or the first surface of the second platform wall portion and/or the second surface of the second platform wall portion is inclined relative to the axial direction by an angle (a) between 25° and 45°.

5. The arrangement according to claim 1,
wherein the platform wall comprises at least one opening to provide cooling liquid communication between the inner cavity and a working fluid passage for providing film cooling.

6. The arrangement according to claim 1,
wherein the platform portion is a radially inner platform portion, and/or
wherein the first side of the first platform wall portion is a radially outer side of the first platform wall portion and/or
wherein the second side of the first platform wall portion is a radially inner side of the first platform wall portion.

7. The arrangement according to claim 1, further comprising
a plate structure for separating a cooling fluid supply chamber from the inner cavity.

8. The arrangement according to claim 7,
wherein the plate structure comprises an impingement band.

9. The arrangement according to claim 7, further comprising
a further seal which is arranged between the support structure and the platform portion at a axial position upstream from the seal, to seal the inner cavity.

10. The arrangement according to claim 9,
wherein the further seal comprises a rope seal.

11. The arrangement according to claim 7,
wherein the plate structure comprises at least one hole for allowing cooling fluid passage from the cooling fluid supply chamber into the inner chamber.

12. The arrangement according to claim 1,
wherein the first surface of the second platform wall portion is a radially outer surface of the second platform wall portion and limits the inner cavity radially inwards.

13. The arrangement according to claim 1,
wherein the support structure comprises a retaining wall extending radially and being arranged downstream of the recess for preventing the seal to move axially downstream when a radially directed force is exerted by the second surface of the second wall portion onto the seal.

14. The arrangement according to claim 13,
wherein the retaining wall extends radially outwards farther than the seal.

15. The arrangement according to claim 13,
wherein a most radially protruding portion of the retaining wall contacts the second surface of the second platform wall portion to provide a limit of a movement of the second surface of the second platform wall portion in the radial direction and/or to provide a seal compression limiting function.

16. The arrangement according to claim 13, further comprising
a mounting hook to mount the platform portion at the support structure axially upstream of the seal and the retaining wall.

17. A nozzle guide vane arrangement, comprising:
a nozzle guide vane support arrangement according to claim 1; and
a nozzle guide vane aerofoil supported by the nozzle guide vane support arrangement.

18. A gas turbine, comprising:
at least one combustor;
the nozzle guide vane arrangement according to claim 17.

19. The gas turbine of claim 18,
wherein the nozzle guide vane aerofoil is the first nozzle guide vane aerofoil at which working fluid is expelled from the combustor impinges.

20. The arrangement according to claim 1,
wherein an extent (la) of the first wall portion in the axial direction is between 5 times and 30 times of the extent in the radial direction.

21. The arrangement according to claim 1,
wherein the support structure comprises a retaining wall extending radially outwards, and being arranged downstream of the recess for preventing the seal to move axially downstream when a radially inward directed force is exerted by the second surface of the second wall portion onto the seal.

22. The arrangement according to claim 1,
wherein the platform portion of the nozzle guide vane is at a trailing edge of a nozzle guide vane aerofoil.

23. The arrangement according to claim 1,
wherein the seal comprises a rope seal.

* * * * *